United States Patent [19]

Hatano et al.

[11] Patent Number: 5,233,450
[45] Date of Patent: Aug. 3, 1993

[54] LIQUID CRYSTAL PHOTOCONDUCTIVE LAYER INCLUDING A BACK-TO-BACK DIODE

[75] Inventors: Akitsugu Hatano; Naofumi Kimura, both of Nara, Japan

[73] Assignee: Sharp Kabushiki Kaisha, Osaka, Japan

[21] Appl. No.: 717,206

[22] Filed: Jun. 18, 1991

[30] Foreign Application Priority Data

Jun. 21, 1990 [JP] Japan .................. 2-163645

[51] Int. Cl.$^5$ .................. G02F 1/1333; G02F 1/135
[52] U.S. Cl. .................. 359/72; 359/74
[58] Field of Search .................. 359/72, 74

[56] References Cited

U.S. PATENT DOCUMENTS

| | | | |
|---|---|---|---|
| 4,206,979 | 6/1980 | Jost | 359/72 |
| 4,600,935 | 7/1986 | Dresner | 257/52 |
| 4,622,654 | 11/1986 | Yaniv et al. | 359/72 X |
| 4,799,773 | 1/1989 | Sterling | 359/72 X |
| 4,842,376 | 6/1989 | Braatz et al. | 359/87 X |
| 4,881,110 | 11/1989 | Braatz et al. | 359/60 X |
| 4,917,474 | 4/1990 | Yamazaki et al. | 359/72 |
| 4,925,276 | 5/1990 | McMurray, Jr. et al. | 359/72 X |
| 4,941,735 | 7/1990 | Moddel et al. | 359/72 X |
| 5,084,777 | 1/1992 | Slobodin | 359/72 X |
| 5,132,814 | 7/1992 | Ohkouchi et al. | 359/72 |
| 5,153,761 | 10/1992 | Marlor | 359/72 |

FOREIGN PATENT DOCUMENTS

| | | |
|---|---|---|
| 0265903 | 5/1988 | European Pat. Off. . |
| WO91114961 | 10/1991 | European Pat. Off. . |
| 57-034525 | 2/1982 | Japan . |
| 57-100411 | 6/1982 | Japan . |
| 57-199272 | 12/1982 | Japan . |

OTHER PUBLICATIONS

I. Abdulhalim, G. Moddel, K. M. Johnson, and C. M. Walker, "Optically Addressed Electroclinic Liquid Crystal Spatial Light Modulator with an a-Si:H Photodiode" Journal of Non-Cystalline Solids 115 pp. 162-164 (1989).

Primary Examiner—William L. Sikes
Assistant Examiner—Ron Trice
Attorney, Agent, or Firm—David G. Conlon; Robert F. O'Connell

[57] ABSTRACT

A liquid crystal element of optical writing type includes a pair of transparent substrates respectively having electrodes formed on the overall surfaces thereof. The liquid crystal element also includes a photoconductive layer formed on one of the transparent substrates and having a back-to-back diode structure, which impedance is to be changed depending on an amount of incident light. The liquid crystal element further includes a mirror layer for reflecting light entered from the other side of a writing side of the photoconductive layer, and a liquid crystal layer disposed between the pair of transparent substrates.

17 Claims, 4 Drawing Sheets

LIQUID CRYSTAL PHOTOCONDUCTIVE LAYER INCLUDING A BACK-TO-BACK DIODE

BACKGROUND OF THE INVENTION

1. Field of the Invention

The present invention relates to a liquid crystal element of optical writing type, and more particularly to the liquid crystal element of optical writing type which is preferably adapted to a projecting type liquid crystal display apparatus arranged to project an image onto a light-reflective screen, a sensor for an image scanner, and a wavelength converting element for converting near infrared light into visible light, for example.

2. Description of the Related Art

The representative related art about the liquid crystal element of optical writing type known by the present inventors will be described in this item.

The liquid crystal element of optical writing type is composed to have glass substrates on both of the outer sides, transparent electrodes formed on the inner sides of the respective glass substrates, a photoconductive layer formed on one of the transparent electrodes, a dielectric mirror layer formed on the photoconductive layer, orientation films formed respectively on the dielectric mirror layer and the other transparent electrode, and a liquid crystal layer disposed between the orientation films.

The photoconductive layer is made of hydrogenated amorphous silicon (referred to as a-Si:H), which layer is formed by means of a plasma CVD method using silane gas and hydrogen gas as raw materials. The dielectric mirror is formed of multi-layered films composed of silicon or silicon oxide by means of a sputtering method. The orientation film is formed on a polyimide film by means of a spin coating technique. The liquid crystal layer is made of nematic liquid crystal.

This kind of liquid crystal element of optical writing type is allowed to have some operation modes such as a twisted nematic (TN) mode, a hybrid field effect (HFE) mode, a guest host (GH) mode, and a phase transition mode.

In operation, an alternating voltage is applied between the transparent electrodes. When a ray of light is emitted from a CRT (Cathode Ray Tube) to one of the glass substrate, the photoconductive layer serves to lower its impedance at the light-hit area (bright condition) so that the applied voltage is strong enough to drive the liquid crystal layer, and keeps its impedance at the other area where no light is hit (dark condition) so that the applied voltage is not strong enough to drive the liquid crystal layer. The contrast between the bright condition and the dark condition results in forming an image.

The foregoing related art uses the a-Si:H layer as its photoconductive layer. The a-Si:H layer has the similar magnitude of dark conductivity as the conductivity of the liquid crystal. It means that the photoconductive layer has the similar magnitude of the impedance as the liquid crystal layer so that a certain amount of voltage is applied to the liquid crystal layer in the dark condition. When a ray of light is hit onto this photoconductive layer, that is, the light-hit area of the photoconductive layer becomes the bright condition, the photoconductive layer lowers its impedance so that the voltage applied to the liquid crystal layer becomes strong enough to drive the liquid crystal at the corresponding portion. However, in this structure, since the impedance of the photoconductive layer is in the similar magnitude as that of the liquid crystal layer as stated above, the ratio of a voltage applied to the liquid crystal layer between the dark condition and the bright condition (on/off voltage ratio) is too small to obtain a high contrast image.

To overcome this shortcoming, the photoconductive layer (a-Si:H layer) may be composed to have Schottky structure or diode structure. The use of such structure leads to the reduction of the voltage applied to the liquid crystal layer in the dark condition where the impedance of the photoconductive layer is made high since it is reverse-biased. It results in enlarging an on/off voltage ratio of the liquid crystal layer between the bright condition and the dark condition. However, this structure has the drawback of applying d. c. voltage component to the liquid crystal. This application of the d. c. voltage to the liquid crystal cell often results in decomposing the liquid crystal material itself and causing attraction of ion components contained in the liquid crystal to the glass substrate, thereby causing the disorder of the molecular orientation and the degradation of the characteristic of the liquid crystal.

SUMMARY OF THE INVENTION

It is therefore an object of the present invention to provide a liquid crystal element of optical writing type which is capable of restricting the application of the d. c. voltage component to the liquid crystal layer and at the same time, forming a high contrast image.

According to the present invention, the above-mentioned object can be achieved by a liquid crystal element of optical writing type which includes a pair of transparent substrates respectively having electrodes formed on the overall surfaces thereof. The liquid crystal element also includes a photoconductive layer formed on one of the transparent substrates and having a back-to-back diode structure, which impedance is to be changed depending on an amount of incident light. The liquid crystal element further includes a mirror layer for reflecting light entered from the other side of a writing side of the photoconductive layer, and a liquid crystal layer disposed between the pair of transparent substrates.

In operation, when a ray of light is incident to the liquid crystal element of optical writing type, the photoconductive layer serves to change its impedance depending on the amount of the incident light. Hence, since a voltage is applied between the electrodes of the liquid crystal element, the voltage can be variably applied to the liquid crystal layer between the transparent substrates depending on the change of the impedance of the photoconductive layer. It results in changing the orientating state of the liquid crystal to form an image. Namely, since the photoconductive layer has the back-to-back diode structure, the impedance on the reverse-biased portion of the diode structure is higher than that of the liquid crystal layer, in the dark condition. It means the voltage is hardly applied to the liquid crystal layer in this dark condition. On the other hand, in the bright condition, the photoconductive layer lowers its impedance by the photoelectric effect, so that the impedance of the photoconductive layer becomes much lower than that of the liquid crystal layer. Thus, most of the voltage applied between the electrodes is in fact applied to the liquid crystal layer, thereby changing the orientating state of the liquid crystal.

Accordingly, the voltage applied to the liquid crystal layer keeps a sufficiently large on/off voltage ratio for the bright and dark conditions, and further, the applied voltage hardly provides a difference due to the polarity in case that the alternating voltage is applied between the electrodes. It results in sufficiently bringing about the optical change of the liquid crystal layer, thereby making it possible to form a high contrast image and effectively restrict the application of the d. c. voltage component to the liquid crystal layer.

In one aspect of the present invention, the photoconductive layer in the back-to-back diode structure is constructed to include a junction with a wider optical band gap at the writing side than that at the other side. In this case, the photoconductive layer may be composed of materials wherein the optical gap formed on the light-writing side, by use of hetero junction for example, is wider than the optical gap formed on the other side. Thus, the writing light can be entered so deeply that the current-voltage characteristic of the back-to-back diode structure is made symmetric with respect to both of the polarities, resulting in applying a symmetric alternating voltage to the liquid crystal layer. To obtain such a symmetric current-voltage characteristic with respect to both of polarities, in the back-to-back diode structure, the writing-light side is made from, for example, hydrogenated amorphous silicon carbide having a wider optical gap than hydrogenated amorphous silicon, while the other side is made from hydrogenated amorphous silicon. Accordingly, in case that the symmetric alternating electric voltage is applied between the electrodes, no d. c. voltage component is substantially applied to the liquid crystal layer.

Further objects and advantages of the present invention will be apparent from the following description of the preferred embodiments of the invention as illustrated in the accompanying drawings.

BRIEF DESCRIPTION OF THE DRAWINGS

FIG. 2, composed of FIGS. 2a to 2c, are charts each showing a voltage waveform applied to a liquid crystal layer of the liquid crystal element of FIG. 1 when it is operated by an alternating electric voltage;

DESCRIPTION OF THE PREFERRED EMBODIMENTS

The preferred embodiments 1 to 12 of the present invention will be described hereinbelow with the accompanying drawings.

The liquid crystal light valve as the preferred embodiment, is characterized in that it includes a photoconductive layer formed in a back-to-back diode structure, in which the diodes are connected in series with reverse polarity, in principle. This kind of photoconductive layer may be made from amorphous materials or crystalline materials. The first embodiment includes the photoconductive layer made from the amorphous silicon.

EMBODIMENT 1

Figure 1:
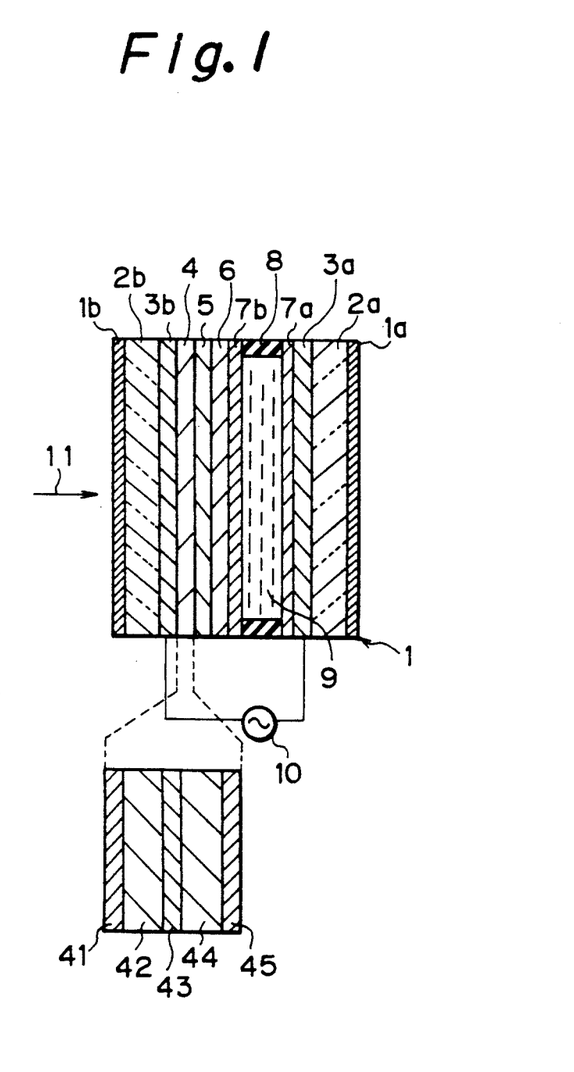
FIG. 1 is a sectional view showing a liquid crystal element of optical writing type (liquid crystal light valve) as a preferred embodiment according to the present invention.

FIG. 1 is a sectional view showing a liquid crystal light valve 1, which includes a pair of glass substrates 2a and 2b having reflection-preventing films 1a, 1b respectively formed thereon. Transparent electrodes 3a and 3b are disposed on the substrates 2a and 2b, respectively. Each of the transparent electrodes 3a and 3b has a multiple layer structure including layers of ITO (indium tin oxide) transparent conductive films and $SnO_2$ (tin oxide) transparent conductive films, and is formed by means of a sputtering method. Alternatively, each of the transparent electrodes 3a and 3b may be composed of a single layer of ITO or $SnO_2$. The transparent electrode 3b may be composed of a metallic semi-transparent film made from Mo, Al, Ta and so forth.

A photoconductive layer 4 is disposed on the transparent electrode 3b. The photoconductive layer 4 is made from hydrogenated amorphous silicon (a-Si:H) and formed in a back-to-back diode structure.

As shown in an expanded portion of FIG. 1, the photoconductive layer 4 has five-layer structure composed of films 41 to 45. Concretely, the photoconductive layer 4 is composed of a p-type a-Si:H film 41, an i-type a-Si:H film 42, an n-type a-Si:H film 43, an i-type a-Si:H film 44, and a p-type a-Si:H film 45. The formation of the photoconductive layer 4 is implemented on the following process.

The p-type a-Si:H film 41 is formed under the conditions of a substrate temperature of 250° C. and a pressure of 0.2 Torr by a plasma CVD method using the mixture of 100 sccm of silane ($SiH_4$) gas, 200 sccm of hydrogen ($H_2$) gas and 0.2 sccm of diborane ($B_2H_6$) gas served as doping gas. The thickness of the p-type a-Si:H film 41 is preferably in the range of 100 to 500 Å (Angstrom). The most preferable thickness is about 200 Å. The i-type a-Si:H film 42 is formed on the p-type a-Si:H film 41. The i-type a-Si:H film 42 is formed by using the mixture of 100 sccm of silane ($SiH_4$) gas and 200 sccm of hydrogen ($H_2$) gas. The thickness of the i-type a-Si:H film 42 is preferably in the range of 0.4 to 2.5 μm. The most preferable thickness is about 0.8 μm.

Then, the n-type a-Si:H film 43 is formed by using the mixture of 100 sccm of silane ($SiH_4$) gas, 200 sccm of hydrogen ($H_2$) gas and 0.1 sccm of phosphine ($PH_3$) gas served as doping gas. The thickness of the n-type a-Si:H film 43 is preferably in the range of 100 to 500 Å. The most preferable thickness is about 350 Å.

Then, the i-type a-Si:H film 44 is formed by using the mixture of 100 sccm of silane ($SiH_4$) gas and 200 sccm of hydrogen ($H_2$) gas. The thickness of the i-type a-Si:H film 44 is preferably in the range of 0.4 to 3.0 μm. The most preferable thickness is about 0.9 μm.

The p-type a-Si:H film 45 is formed by using the mixture of 100 sccm of silane ($SiH_4$) gas, 200 sccm of hydrogen ($H_2$) gas and 0.2 sccm of diborane ($B_2H_6$) gas served as doping gas. The thickness of the p-type a-Si:H film 45 is preferably in the range of 100 to 700 Å. The most preferable thickness is about 250 Å.

In forming the films, the preferable temperature is 200° C. to 300° C. but the room temperature is also allowable. The glass substrate 2b is made, for example, of 7059 glass manufactured by the Corning Company. However, it goes without saying that the glass substrate may be made of another kind of glass. Further, the mixing ratios of the gases are not limited to the foregoing values. The mixing ratios of the gases can be selected so as to obtain a desired characteristic.

A light-screening layer 5 is disposed on the photoconductive layer 4. The light-screening layer 5 is formed by means of a spin coating technique using carbon dispersed type black acrylic resin. The thickness of the light-screening layer 5 is about 1 μm. This light-screening layer 5 may employ an inorganic material such as praseodymium manganese oxide ($PrMnO_3$) and cermet.

Then, a dielectric mirror layer 6 is disposed on the light-screening layer 5. The dielectric mirror layer 6 has a multiple layer structure including silicon films and silicon dioxide films and is formed by means of an electron beam vaporing technique. The dielectric mirror layer 6 may employs as raw materials zirconia oxide ($ZrO_2$) and magnesium fluoride ($MgF_2$).

Orientation films 7a and 7b are disposed on the transparent electrode 3a and the dielectric mirror layer 6 respectively. Each of the orientation films 7a and 7b is made of polyimide film which is formed by means of a spin coating technique and is applied with a molecular orientation process by means of a rubbing technique. The glass substrates 2a and 2b are attached together through spacer 8. A liquid crystal layer 9 is disposed between the orientation films 7a and 7b.

A liquid crystal layer 9 is formed by pouring and sealing a composite nematic liquid crystal. The thickness of the cell of the liquid crystal is about 6 μm.

In the operation of the liquid crystal light valve 1, a hybrid electric field mode is used as the operation mode of the light valve 1.

An a.c. power source 10 serves to apply a pure alternating voltage between the transparent electrodes 3a and 3b included in the liquid crystal light valve 1. When a ray of light 11 for writing is incident to the liquid crystal light valve 1 from the side of the glass substrate 2b, the photoconductive layer 4 serves to lower its impedance on an area where the light 11 is hit (bright condition) so that the alternating voltage is applied by the power source 10 to the liquid crystal layer 9. On the area where no light is hit (dark condition), on the other hand, the photoconductive layer 4 serves to keep its impedance high at the junction portion where the alternating electric voltage is to be reversely biased i.e. its impedance is kept higher than the impedance of the liquid crystal at the other portion by 1 or 2 digits, so that only a lower voltage than a threshold voltage is applied to the liquid crystal layer 9. The difference of the impedances between the bright condition and the dark condition results in forming an image.

Figure 2A:
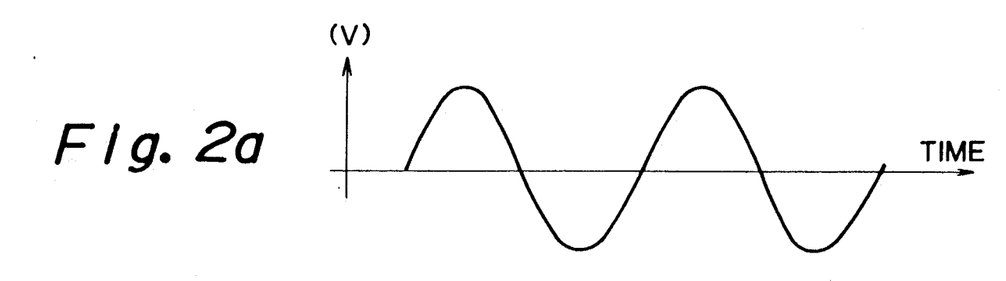
Figure 2B:
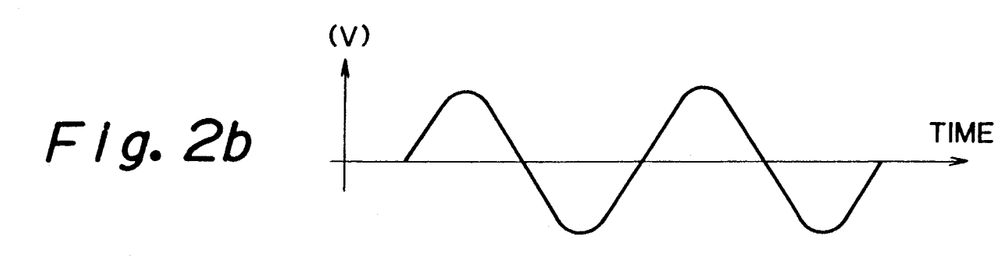
Figure 2C:
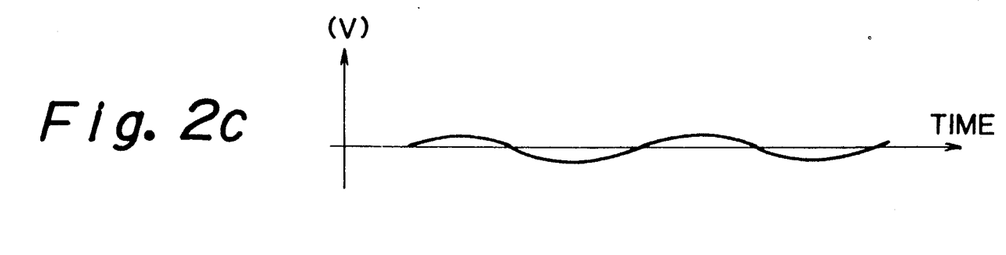
Figure 3:
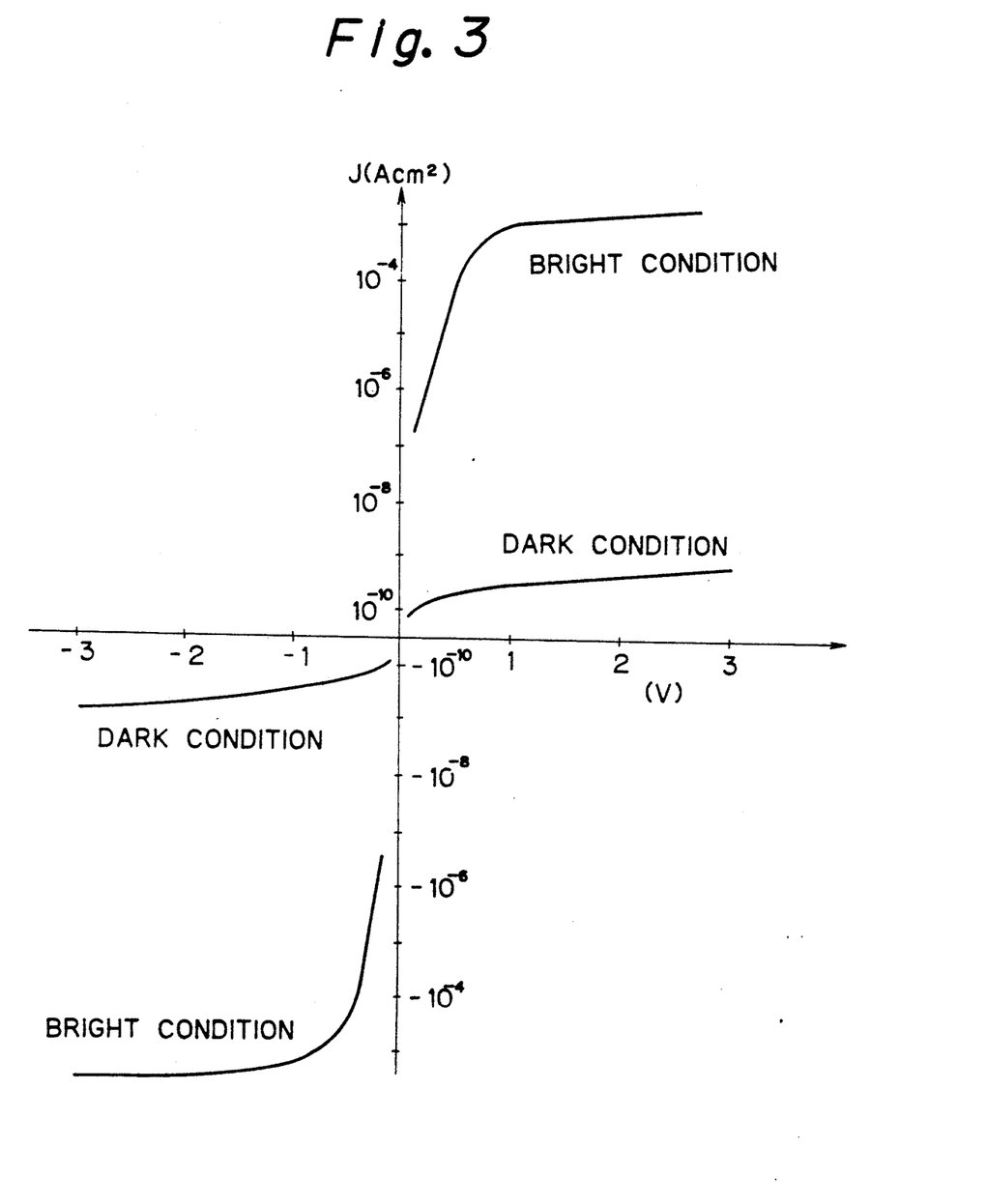
FIG. 3 is a graph showing a current-voltage characteristic of a photoconductive layer of the liquid crystal element of FIG. 1.

FIG. 2 show voltage waveforms to be applied to the liquid crystal in the bright condition and the dark condition. As shown, FIG. 2a denotes a voltage applied between the electrodes 3a and 3b, FIG. 2b denotes a voltage applied to the liquid crystal in the bright condition, and FIG. 2c denotes a voltage applied to the liquid crystal in the dark condition. The graphs indicate that the positive and negative voltages are applied to the liquid crystal in the substantially same manner in the bright condition and the dark condition without applying d.c. voltage components.

In operation, when the ray of the light 11 is incident to the liquid crystal light valve 1, the photoconductive layer 4 serves to change its impedance depending on the amount of the incident light 11. Since the photoconductive layer 4 has the back-to-back diode structure, the impedance on the reverse-biased portion of the diode structure is much higher than that of the liquid crystal layer 9, in the dark condition. It means the voltage is hardly applied to the liquid crystal layer 9 in the dark condition, In the bright condition, the photoconductive layer 4 lowers its impedance so that most of the voltage applied between the electrodes 3a, 3b is applied to the liquid crystal layer 9, thereby changing the orientating state of the liquid crystal. Hence, the voltage applied to the liquid crystal keeps a sufficiently large on/off voltage ratio for the bright and dark conditions and the applied voltage hardly provides a difference due to the polarity of the alternating voltage. It results in sufficiently bringing about the optical change of the liquid crystal layer 9, thereby making it possible to form a high contrast image and effectively restricting the application of d.c. voltage component to the liquid crystal layer 9, according to the present embodiment.

Figure 4:
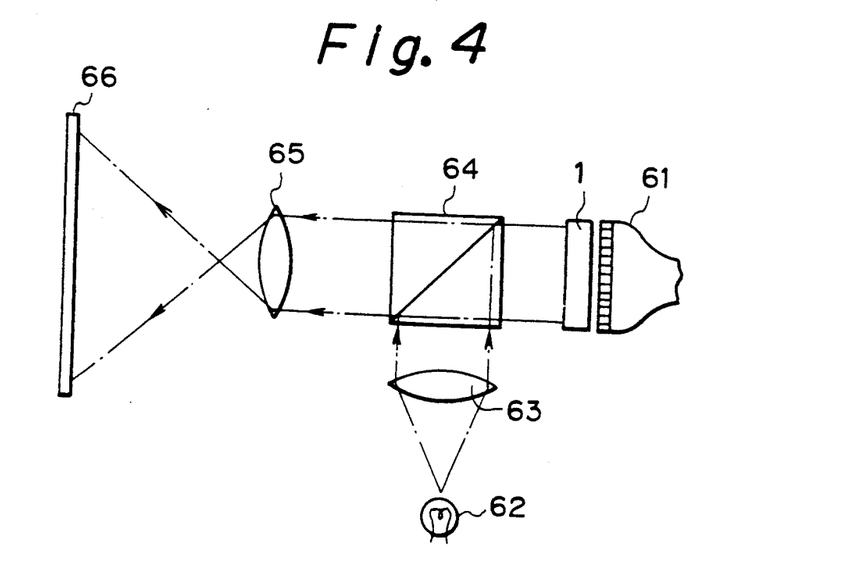
FIG. 4 is a schematic view of a liquid crystal display system of projecting type in which the liquid crystal element of FIG. 1 is utilized.

FIG. 4 shows a liquid crystal display system of projecting type in which the liquid crystal light valve 1 is utilized.

In FIG. 4, a CRT is used to write an image on the liquid crystal light valve 1. For projecting the image written on the liquid crystal light valve 1, the lamp 62 emits a ray of light to the liquid crystal light valve 1 through the lens 63 and the polarization beam splitter 64. The incident ray of light is reflected on the dielectric mirror 6 though the liquid crystal layer 9. In case the reflected light is passed through the portion of the liquid crystal layer 9 where the orientating state is changed, the reflected light changes its polarizing direction by the electro-optical effect of that portion of the liquid crystal, so that the reflected light is allowed to pass through the polarization beam splitter 64. The reflected light is expanded through the lens 65, resulting in allowing the image written on the liquid crystal light valve 1 to be projected onto the screen 66.

The light-screening layer 5 is provided because it is difficult to completely reflect the white light which is emitted from the lamp 61 by the dielectric mirror 6 and which may influence the photoconductive layer 4. However, if the incident light is completely reflected off by the dielectric mirror 6, the light-screening layer 5 is unnecessary. For example, in case of using a coherent beam source such as a laser in place of the lamp 61, the light screening layer 5 can be omitted in the present embodiment.

In place of the CRT, it is possible to use another means for writing an image, such as a plasma display, a LED display or a laser device.

As will be appreciated from the above description, the present invention is characterized by providing the photoconductive layer 4. The following embodiments will be described mainly about the photoconductive layer 4.

EMBODIMENT 2

In this embodiment, the photoconductive layer 4 included in the liquid crystal light valve 1 shown in FIG. 1 is formed in a back-to-back diode structure made from hydrogenated amorphous silicon.

The photoconductive layer 4 is composed of a p-type a-Si:H film 41, an i-type a-Si:H film 42, an n-type a-Si:H film 43, an i-type a-Si:H film 44, and a p-type a-Si:H film 45. The formation of the photoconductive layer 4 is implemented on the following process.

The p-type a-Si:H film 41 is formed by a plasma CVD method using silane ($SiH_4$) gas, hydrogen ($H_2$) gas and doping gas ($B_2H_6$). The thickness of the p-type a-Si:H film 41 is preferably in the range of 100 to 500 Å. The most preferable thickness is about 200 Å.

The i-type a-Si:H film 42 is formed on the p-type a-Si:H film 41 by using silane (SiH$_4$) gas and hydrogen (H$_2$) gas. The thickness of the i-type a-Si:H film 42 is preferably in the range of 0.4 to 2.5 μm. The most preferable thickness is about 0.5 μm.

Then, the n-type a-Si:H film 43 is formed by using silane (SiH$_4$) gas, hydrogen (H$_2$) gas and doping gas (PH$_3$). The thickness of the n-type a-Si:H film 43 is preferably in the range of 100 to 500 Å. The most preferable thickness is about 350 Å.

Then, the i-type a-Si:H film 44 is formed by using silane (SiH$_4$) gas and hydrogen (H$_2$) gas. The thickness of the i-type a-Si:H film 44 is preferably in the range of 0.4 to 3.0 μm. The most preferable thickness is about 0.6 μm.

The p-type a-Si:H film 45 is formed by using silane (SiH$_4$) gas, hydrogen (H$_2$) gas and doping gas (B$_2$H$_6$). The thickness of the p-type a-Si:H film 45 is preferably in the range of 100 to 700 Å. The most preferable thickness is about 250 Å.

The light-screening layer 5 is formed on the photoconductive layer 4 by using carbon dispersed type black acrylic resin by means of a spin coating technique, so that the thickness of the light-screening layer 5 is about 1 μm. Then the dielectric mirror 6 is formed on the light-screening layer 5 so as to have multiple layer structure including films of silicon oxide and titanium oxide by means of an electron beam vaporing technique.

Next, the orientation films 7a and 7b are formed on the dielectric mirror 6 and the transparent electrode 3a respectively. The orientation films 7a and 7b are made of silicon oxide and obliquely deposited by means of the electron beam vaporing technique.

The glass substrates 2a and 2b are attached to each other through the spacer 8. The liquid crystal layer 9 is formed between the orientation films 7a and 7b by pouring and sealing a ferroelectric liquid crystal CS-1014 manufactured by the Chisso Company. The thickness of the cell is about 2 μm.

Figure 5:
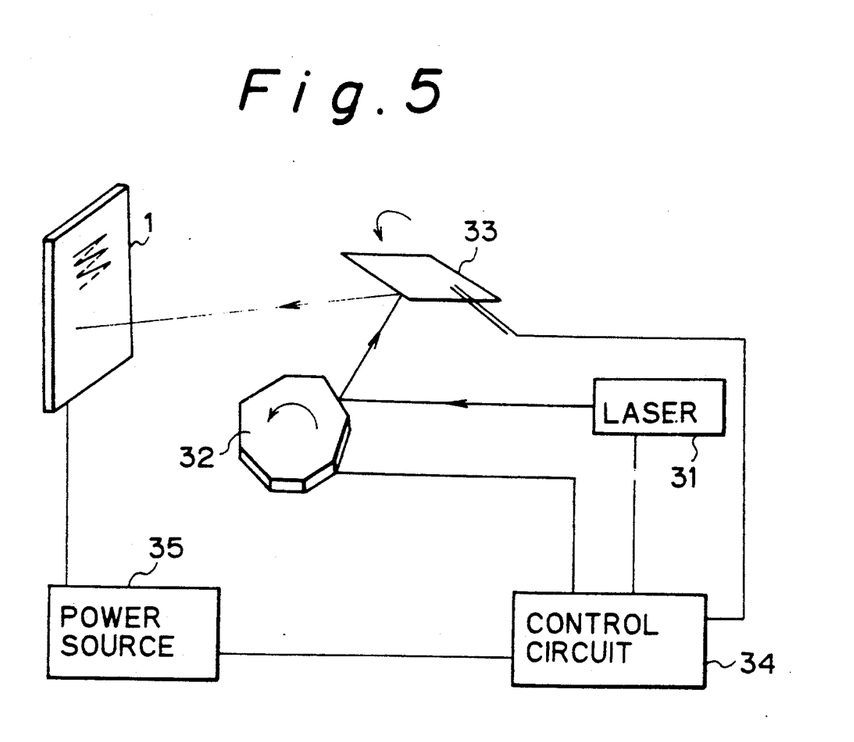
FIG. 5 is a diagram of an optical system for writing the liquid crystal element of FIG. 1.

FIG. 5 is a diagram showing an optical writing system which can be utilized in place of the CRT 61 of FIG. 4. The laser beam emitted from a laser 31 is scanned through a polygon mirror 32 and a galvano mirror 33 controlled by a control circuit 34 so that an image is written on the liquid crystal light valve 1. The liquid crystal light valve 1 is driven by a power source 35 operated in synchronization with the control circuit 34. The polarity of the voltage applied to the liquid crystal light valve 1 in writing an image is opposite to the polarity of the voltage applied in erasing an image.

The embodiment 2 has thinner i-type a-Si:H layer 42 and i-type a-Si:H layer 44 than the embodiment 1 in order to suit to the ferroelectric liquid crystal.

EMBODIMENT 3

In this embodiment, the photoconductive layer 4 included in the liquid crystal light valve 1 shown in FIG. 1 is formed in a back-to-back diode structure and is made from hydrogenated amorphous silicon.

This photoconductive layer 4 is composed of an n-type a-Si:H film 41, an i-type a-Si:H film 42, a p-type a-Si:H film 43, an i-type a-Si:H film 44, and an n-type a-Si:H film 45. The formation of the photoconductive layer 4 is implemented on the following process.

The n-type a-Si:H film 41 is formed under the conditions of a substrate temperature of 300° C. and a pressure of 0.15 Torr by a plasma CVD method using the mixture of 80 sccm of silane (SiH$_4$) gas, 240 sccm of hydrogen (H$_2$) gas and 0.1 sccm of doping gas (PH$_3$). The thickness of the n-type a-Si:H film 41 is preferably in the range of 100 to 500 Å. The most preferable thickness is about 250 Å.

The i-type a-Si:H film 42 is formed on the n-type a-Si:H film 41. The i-type a-Si:H film 42 is formed by using the mixture of 80 sccm of silane (SiH$_4$) gas and 240 sccm of hydrogen (H$_2$) gas. The thickness of the i-type a-Si:H film 42 is preferably in the range of 0.4 to 2.5 μm. The most preferable thickness is about 0.8 μm.

Then, the p-type a-Si:H film 43 is formed by using the mixture of 80 sccm of silane (SiH$_4$) gas, 240 sccm of hydrogen (H$_2$) gas and 0.15 sccm of doping gas (B$_2$H$_6$). The thickness of the p-type a-Si:H film 43 is preferably in the range of 100 to 500 Å. The most preferable thickness is about 200 Å.

Then, the i-type a-Si:H film 44 is formed by using the mixture of 80 sccm of silane (SiH$_4$) gas and 240 sccm of hydrogen (H$_2$) gas. The thickness of the i-type a-Si:H film 44 is preferably in the range of 0.4 to 3.0 μm. The most preferable thickness is about 0.9 μm.

The n-type a-Si:H film 45 is formed by using the mixture of 80 sccm of silane (SiH$_4$) gas, 240 sccm of hydrogen (H$_2$) gas and 0.1 sccm of doping gas (PH$_3$). The thickness of the i-type a-Si:H film 45 is preferably in the range of 100 to 600 Å. The most preferable thickness is about 250 Å.

It goes without saying that the mixing ratios of gases are not limited to the foregoing values and the mixing ratios of gases may be selected so as to obtain a desired characteristic.

The other structure of the embodiment 3 is the same as that of the embodiment 1.

As described above, the foregoing embodiments 1 to 3 have the photoconductive layer 4 made from the a-Si:H material. According to the characteristic of the a-Si:H material, the incident light tends to be attenuated along the passage of the light through the photoconductive layer 4. Thus, the application of the alternating voltage causes the voltage-current characteristic to be slightly different between the +and −polarities of the voltage. When an alternating voltage is applied between the electrodes 3a and 3b, however, the d.c. voltage component applied to the liquid crystal is negligible, because the photoconductive layer 4 has much smaller impedance than the liquid crystal layer 9 by about 2 to 3 digits.

Such a shortcoming as for the voltage-current characteristic can be overcome by forming the photoconductive layer 4 to have a larger optical band gap on the writing side than that on the other side. The following embodiment employs the photoconductive layer 4 to satisfy this condition.

EMBODIMENT 4

In this embodiment, the photoconductive layer 4 is formed in a back-to-back diode structure including a hetero junction made from hydrogenated amorphous silicon carbide (a-SiC:H) and hydrogenated amorphous silicon (a-Si:H).

The photoconductive layer 4 is composed of a p-type a-SiC:H film 41, an i-type a-SiC:H film 42, an n-type a-SiC:H film 43, an i-type a-Si:H film 44, and a p-type a-Si:H film 45. The formation of the photoconductive layer 4 is implemented on the following process.

The p-type a-SiC:H film 41 is formed under the conditions of a substrate temperature of 300° C. and a pressure of 0.4 Torr by a plasma CVD method using the mixture of 100 sccm of silane ($SiH_4$) gas, 250 sccm of hydrogen ($H_2$) gas, 60 sccm of methane ($CH_4$) gas, and 0.3 sccm of diborane ($B_2H_6$) gas served as doping gas. The thickness of the p-type a-Si:H film 41 is preferably in the range of 100 to 600 Å. The most preferable thickness is about 300 Å.

The i-type a-SiC:H film 42 is formed on the p-type a-SiC:H film 41. The i-type a-SiC:H film 42 is formed by using the mixture of 100 sccm of silane ($SiH_4$) gas, 250 sccm of hydrogen ($H_2$) gas and 20 sccm of methane ($CH_4$) gas. The thickness of the i-type a-SiC:H film 42 is preferably in the range of 0.4 to 2.0 μm. The most preferable thickness is about 0.5 μm.

Then, the n-type a-SiC:H film 43 is formed by using the mixture of 100 sccm of silane ($SiH_4$) gas, 250 sccm of hydrogen ($H_2$) gas, 20 sccm of methane ($CH_4$) gas, and 0.4 sccm of phosphine ($PH_3$) gas served as doping gas. The thickness of the n-type a-SiC:H film 43 is preferably in the range of 100 to 600 Å. The most preferable thickness is about 400 Å.

Then, the i-type a-Si:H film 44 is formed by using the mixture of 100 sccm of silane ($SiH_4$) gas and 200 sccm of hydrogen ($H_2$) gas. The thickness of the i-type a-Si:H film 44 is preferably in the range of 0.4 to 3.0 μm. The most preferable thickness is about 0.5 μm.

The p-type a-Si:H film 45 is formed by using the mixture of 100 sccm of silane ($SiH_4$) gas, 200 sccm of hydrogen ($H_2$) gas and 0.2 sccm of diborane ($B_2H_6$) gas served as doping gas. The thickness of the p-type a-Si:H film 45 is preferably in the range of 100 to 600 Å. The most preferable thickness is about 300 Å.

In forming the films, the preferable temperature is 200° C. to 350° C. but the room temperature is also allowable. The glass substrate 2b may be made of 7059 glass manufactured by the Corning Company. However, it goes without saying that the glass substrate may be made of another kind of glass. Further, the mixing ratios of gases are not limited to the foregoing values. The mixing ratios of gases may be selected so as to obtain a desired characteristic.

In this embodiment, the hetero junction is formed between the n-type a-SiC:H film 43 and the i-type a-Si:H film 44.

The photoconductive layer 4 in the next embodiment to be described below, is formed in a back-to-back diode structure including the hetero junction between the hydrogenated amorphous silicon carbide (a-SiC:H) and the hydrogenated amorphous silicon (a-Si:H).

EMBODIMENT 5

In this embodiment, the photoconductive layer 4 is composed of an n-type a-SiC:H film 41, an i-type a-SiC:H film 42, a p-type a-SiC:H film 43, an i-type a-Si:H film 44, and an n-type a-Si:H film 45. The hetero junction is formed between the p-type a-SiC:H film 43 and the i-type a-Si:H film 44.

As a method of forming the films, the n-type a-SiC:H film 41 is formed under the conditions of a substrate temperature of 250° C. and a pressure of 0.3 Torr by a plasma CVD method using the mixture of 50 sccm of silane ($SiH_4$) gas, 300 sccm of hydrogen ($H_2$) gas, 20 sccm of methane ($CH_4$) gas and 0.1 sccm of doping gas ($PH_3$). The thickness of the n-type a-SiC:H film 41 is preferably in the range of 100 to 600 Å. The most preferable thickness is about 400 Å.

The i-type a-SiC:H film 42 is formed on the n-type a-SiC:H film 41. The i-type a-SiC:H film 42 is formed by using the mixture of 50 sccm of silane ($SiH_4$), 300 sccm of hydrogen ($H_2$) gas and 10 sccm of methane ($CH_4$) gas. The thickness of the i-type a-SiC:H film 42 is preferably in the range of 0.4 to 2.0 μm. The most preferable thickness is about 0.5 μm.

Then, the p-type a-SiC:H film 43 is formed by using the mixture of 50 sccm of silane ($SiH_4$) gas, 300 sccm of hydrogen ($H_2$) gas, 10 sccm of methane ($CH_4$) gas and 0.1 sccm of doping ($B_2H_6$) gas. The thickness of the p-type a-SiC:H film 43 is preferably in the range of 100 to 600 Å. The most preferable thickness is about 250 Å.

Then, the i-type a-Si:H film 44 is formed by using the mixture of 80 sccm of silane ($SiH_4$) gas and 240 sccm of hydrogen ($H_2$) gas. The thickness of the i-type a-Si:H film 44 is preferably in the range of 0.4 to 3.0 μm. The most preferable thickness is about 0.6 μm.

The n-type a-Si:H film 45 is formed by using the mixture of 80 sccm of silane ($SiH_4$) gas, 240 sccm of hydrogen ($H_2$) gas and 0.1 sccm of doping ($PH_3$) gas. The thickness of the n-type a-Si:H film 45 is preferably in the range of 100 to 700. The most preferable thickness is about 300.

It goes without saying that the mixing ratios of gases are not limited to the foregoing values and the mixing ratios of gases may be selected so as to obtain a desired characteristic. The other structure of the embodiment 5 is the same as that of the embodiment 1.

In the conditions for forming the films 41 to 45 of the photoconductive layer 4, the mixing ratios of gases are just required to be selected for obtaining a desired characteristic. Thus, the following embodiment leaves out the illustration of the mixing ratios.

EMBODIMENT 6

In this embodiment, the photoconductive layer 4 is composed of an n-type a-SiC:H film 41, an i-type a-SiC:H film 42, a p-type a-Si:H film 43, an i-type a-Si:H film 44, and an n-type a-Si:H film 45. The hetero junction is formed between the i-type a-SiC:H film 42 and the p-type a-Si:H film 43.

As a method for forming the films, the n-type a-SiC:H film 41 is formed by a plasma CVD method using the mixture of silane ($SiH_4$) gas, hydrogen ($H_2$) gas, methane ($CH_4$) gas, and doping gas ($PH_3$). The thickness of the n-type a-SiC:H film 41 is preferably in the range of 100 to 600 Å. The most preferable thickness is about 400 Å.

The i-type a-SiC:H film 42 is formed on the n-type a-SiC:H film 41 by using the mixture of silane ($SiH_4$) gas, hydrogen ($H_2$) gas and methane ($CH_4$) gas. The thickness of the i-type a-SiC:H film 42 is preferably in the range of 0.4 to 2.0 μm. The most preferable thickness is about 0.5 μm.

Then, the p-type a-Si:H film 43 is formed by using the mixture of silane ($SiH_4$) gas, hydrogen ($H_2$) gas and doping gas ($B_2H_6$). The thickness of the p-type a-Si:H film 43 is preferably in the range of 100 to 600 Å. The most preferable thickness is about 250 Å.

Then, the i-type a-Si:H film 44 is formed by using the mixture of silane ($SiH_4$) gas and hydrogen ($H_2$) gas. The thickness of the i-type a-Si:H film 44 is preferably in the range of 0.4 to 3.0 μm. The most preferable thickness is about 0.6 μm.

The n-type a-Si:H film 45 is formed by using the mixture of silane ($SiH_4$) gas, hydrogen ($H_2$) gas and doping gas ($PH_3$). The thickness of the n-type a-Si:H film 45 is preferably in the range of 100 to 700 Å. The most preferable thickness is about 300 Å.

EMBODIMENT 7

The photoconductive layer 4 is composed of an n-type a-SiC:H film 41, an i-type a-SiC:H film 42, a p-type a-Si:H film 43, an i-type a-Si:H film 44, and an n-type a-Si:H film 45. The hetero junction is formed between the i-type a-SiC:H film 42 and the p-type a-Si:H film 43.

As a method for forming the films, the n-type a-SiC:H film 41 is formed by a reactive sputtering method. Namely, the n-type a-SiC:H film 41 is formed by sputtering argon (Ar) to a silicon target in the introduced reactive gases such as hydrogen ($H_2$) gas, methane ($CH_4$) gas, and phosphine ($PH_3$) gas served as doping gas. The thickness of the n-type a-SiC:H film 41 is preferably in the range of 100 to 600 Å. The most preferable thickness is about 400 Å.

The i-type a-SiC:H film 42 is formed on the n-type a-SiC:H film 41 by a reactive sputtering method. Namely, the i-type a-SiC:H film 42 is formed by sputtering argon (Ar) to a silicon target in the reactive gases such as hydrogen ($H_2$) gas and methane ($CH_4$) gas. The thickness of the i-type a-SiC:H film 42 is preferably in the range of 0.4 to 2.0 μm. The most preferable thickness is about 0.5 μm.

Then, the p-type a-Si:H film 43 is formed by a plasma CVD method using the mixture of silane ($SiH_4$) gas, hydrogen ($H_2$) gas and diborane ($B_2H_6$) gas. The thickness of the p-type a-Si:H film 43 is preferably in the range of 100 to 600 Å. The most preferable thickness is about 250 Å.

Then, the i-type a-Si:H film 44 is formed by a plasma CVD method using the mixture of silane ($SiH_4$) gas and hydrogen ($H_2$) gas. The thickness of the i-type a-Si:H film 44 is preferably in the range of 0.4 to 3.0 μm. The most preferable thickness is about 0.6 μm.

The n-type a-Si:H film 45 is formed by using the mixture of silane ($SiH_4$) gas, hydrogen ($H_2$) gas and doping gas ($PH_3$). The thickness of the n-type a-Si:H film 45 is preferably in the range of 100 to 700 Å. The most preferable thickness is about 300 Å. The other structure of the embodiment 7 is the same as that of the embodiment 1.

EMBODIMENT 8

The photoconductive layer 4 is composed of an n-type a-SiC:H film 41, an i-type a-SiC:H film 42, a p-type a-Si:H film 43, an i-type a-Si:H film 44, and an n-type a-Si:H film 45. The hetero junction is formed between the n-type a-SiC:H film 41 and the i-type a-Si:H film 42.

As a method for forming the films, the n-type a-SiC:H film 41 is formed by a plasma CVD method using the mixture of disilane ($Si_2H_6$) gas, hydrogen ($H_2$) gas, ethylene ($C_2H_4$) gas, and doping gas ($PH_3$). The thickness of the n-type a-SiC:H film 41 is preferably in the range of 100 to 600 Å. The most preferable thickness is about 400 Å.

The i-type a-SiC:H film 42 is formed on the n-type a-SiC:H film 41 by using the mixture of disilane ($Si_2H_6$) gas and hydrogen ($H_2$) gas. The thickness of the i-type a-SiC:H film 42 is preferably in the range of 0.3 to 2.5 μm. The most preferable thickness is about 0.5 μm.

Then, the p-type a-Si:H film 43 is formed by using the mixture of disilane ($Si_2H_6$) gas, hydrogen ($H_2$) gas and doping gas ($B_2H_6$). The thickness of the p-type a-Si:H film 43 is preferably in the range of 100 to 600 Å. The most preferable thickness is about 250 Å.

Then, the i-type a-Si:H film 44 is formed by using the mixture of disilane ($Si_2H_6$) gas and hydrogen ($H_2$) gas. The thickness of the i-type a-Si:H film 44 is preferably in the range of 0.4 to 3.0 μm. The most preferable thickness is about 0.6 μm.

The n-type a-Si:H film 45 is formed by using the mixture of disilane ($Si_2H_6$) gas, hydrogen ($H_2$) gas and doping gas ($PH_3$). The thickness of the n-type a-Si:H film 45 is preferably in the range of 100 to 700 Å. The most preferable thickness is about 300 Å. The other structure of the embodiment 8 is the same as that of the embodiment 1.

In the foregoing embodiments 5 to 8, the formation of the hetero junction at respective locations, are explained. Likewise, in the embodiment 4, the hetero junction may be shifted to the writing side further than the location between the films 43 and 44.

To form a larger optical band gap on the writing side than the other side in the photoconductive layer 4, it is possible to use the characteristic that the hydrogenated amorphous silicon carbide has a larger optical band gap than the hydrogenated amorphous silicon like the embodiments 4 to 8, as well as the characteristic that the hydrogenated amorphous silicon germanium has a smaller optical band gap than the hydrogenated amorphous silicon. Thus, in the foregoing embodiments, at least one of the films 43, 44, 45 may be formed from the hydrogenated amorphous silicon germanium so as to utilize this latter characteristic.

More concretely, in the embodiments 1 and 2, at least one of the n-type a-Si:H film 43, the i-type a-Si:H film 44 and the p-type a-Si:H film 45 may be made from the amorphous silicon germanium, for example. For making the film, the mixed gas of the silane ($SiH_4$) or the disilane ($Si_4H_6$) and the germane ($GeH_4$ or $Ge_2H_6$) may be used. Further, the combination of this method with the embodiments 4 to 8 may be allowed.

As the material providing a wider band gap, hydrogenated amorphous silicon nitride (a-SiN:H), the a-SiN:H with carbon added thereto, and hydrogenated amorphous silicon oxide (a-SiO:H) may be utilized in addition to the hydrogenated amorphous silicon carbide (a-SiC:H). As the materials providing a smaller band gap, hydrogenated amorphous silicon tin (a-SiSn:H) may be utilized in addition to the hydrogenated amorphous silicon germanium (a-SiGe:H). Here, the combination of these materials enables to form a larger optical band gap at the writing side in the photoconductive layer 4.

The above-mentioned embodiments employ the hetero junction for providing a wider optical band gap on the writing side than the other side in the photoconductive layer 4. Instead, a homo junction may be used with a changed adjusting ratio of the materials, for example, the changed carbon amount. The following embodiment 9 employs this homo junction method.

EMBODIMENT 9

In this embodiment, the photoconductive layer 4 is formed in a back-to-back diode structure made from the hydrogenated amorphous silicon carbide (a-SiC:H).

The photoconductive layer 4 is composed of a p-type a-SiC:H film 41, an i-type a-SiC:H film 42, an n-type a-SiC:H film 43, an i-type a-Si:H film 44, and a p-type a-Si:H film 45.

As a method for forming the films, the p-type a-SiC:H film 41 is formed under the conditions of a substrate temperature of 300° C. and a pressure of 0.3 Torr by a plasma CVD method using the mixture of 100 sccm of silane (SiH$_4$) gas, 200 sccm of hydrogen (H$_2$) gas, 120 sccm of methane (CH$_4$) gas and 0.5 sccm of doping gas (B$_2$H$_6$). The thickness of the p-type a-SiC:H film 41 is preferably in the range of 100 to 500 Å. The most preferable thickness is about 200 Å.

The i-type a-SiC:H film 42 is formed on the p-type a-SiC:H film 41 by using the mixture of 100 sccm of silane (SiH$_4$) gas, 100 sccm of methane (CH$_4$) gas, and 200 sccm of hydrogen (H$_2$) gas. The thickness of the i-type a-SiC:H film 42 is preferably in the range of 0.3 to 2.5 μm. The most preferable thickness is about 0.6 μm.

Then, the n-type a-Si:H film 43 is formed by using the mixture of 100 sccm of silane (SiH$_4$) gas, 100 sccm of methane (CH$_4$) gas, 200 sccm of hydrogen (H$_2$) gas and 0.5 sccm of doping gas (PH$_3$). The thickness of the n-type a-Si:H film 43 is preferably in the range of 100 to 600. The most preferable thickness is about 300.

Then, the i-type a-SiC:H film 44 is formed by using the mixture of 100 sccm of silane (SiH$_4$) gas, 50 sccm of methane (CH$_4$) gas and 200 sccm of hydrogen (H$_2$) gas. The thickness of the i-type a-SiC:H film 44 is preferably in the range of 0.4 to 3.0 μm. The most preferable thickness is about 0.7 μm.

The p-type a-SiC:H film 45 is formed by using the mixture of 100 sccm of silane (SiH$_4$) gas, 50 sccm of methane (CH$_4$) gas, 200 sccm of hydrogen (H$_2$) gas and 0.5 sccm of doping gas (B$_2$H$_6$). The thickness of the p-type a-SiC:H film 45 is preferably in the range of 100 to 700 Å. The most preferable thickness is about 300 Å.

As stated above, the amount of the used methane gas is different between the films 41 and 42, and between the films 43 and 44. More methane gas results in providing more carbon contained in the film, thereby making an optical band gap larger.

It goes without saying that in forming the films, the mixing ratios of the gases are not limited to the foregoing values and the mixing ratios of gases may be selected so as to obtain a desired characteristic.

To provide the large optical band gap on the writing side, at least one film is required to contain the more amount of carbon on the writing side of the film. Like the carbon, it is just necessary to adjust the amount of the other materials whose optical band gap is to be adjusted for the purpose of providing the larger optical band gap on the writing side than on the other side. Further, the homo junction is just required to apply to at least one of the junctions between the adjacent ones of the films 41 to 44.

Next, the embodiment using a crystalline photoconductive layer 4 will be described below.

EMBODIMENT 10

In this embodiment, the photoconductive layer 4 is formed in a back-to-back diode structure made from polycrystalline silicon (poly-Si).

The photoconductive layer 4 has three-layer structure composed of films 41, 43, and 45. Concretely, the photoconductive layer 4 is composed of an n-type poly-Si film 41, a p-type poly-Si film 43, and an n-type poly-Si film 45.

As a method for forming the films, the n-type poly-Si film 41 is formed by a decompression heat CVD method using silane (SiH$_4$) gas and doping gas (PH$_3$). The temperature for forming the film is preferably in the range of 600° to 650° C. The most preferable temperature is about 620° C. Hence, the glass substrate 2b is preferably made of a heat resisting material, for example, quartz glass. The thickness of the film 41 is preferably in the range of 0.2 to 2.6 μm. The most preferable thickness is about 0.5 μm.

Then, the p-type poly-Si film 43 is formed by using silane (SiH$_4$) gas and doping gas (B$_2$H$_6$). The thickness of the film 43 is preferably in the range of 0.3 to 3.2 μm. The most preferable thickness is about 1.2 μm.

Next, the n-type poly-Si film 45 is formed by using silane gas (SiH$_4$) and doping gas (PH$_3$). The thickness of the film 45 is preferably in the range of 0.1 to 2.0 μm. The most preferable thickness is about 0.6 μm.

For implementing the doping to the poly-Si material, it is possible to use an ion plantation technique for doping after forming the film in place of the introduction of the doping gas while forming the film.

EMBODIMENT 11

In this embodiment, the photoconductive layer 4 is formed in a back-to-back diode structure made from polycrystalline silicon (poly-Si). The photoconductive layer 4 is composed of three films, i.e. a p-type poly-Si film 41, an n-type poly-Si film 43, and a p-type poly-Si film 45.

As a method for forming the films, the p-type poly-Si film 41 is formed by a decompression heat CVD method using silane (SiH$_4$) gas and doping gas (B$_2$H$_6$). The temperature for forming the film is preferably in the range of 600° to 650° C. The most preferable temperature is about 620° C. The thickness of the film 41 is preferably in the range of 0.3 to 3.0 μm. The most preferable thickness is about 0.4 μm.

Then, the n-type poly-Si film 43 is formed by using silane (SiH$_4$) gas and doping gas (PH$_3$). The proper thickness of the film 43 is in the range of 0.4 to 3.0 μm. The most preferable thickness is about 1.0 μm.

Next, the p-type poly-Si film 45 is formed by using silane (SiH$_4$) gas and doping gas (B$_2$H$_6$). The thickness of the film 45 is preferably in the range of 0.2 to 2.0 μm. The most preferable thickness is about 0.5 μm.

For implementing the doping to the poly-Si material, it is possible to use an ion plantation technique for doping after forming the film in place of the introduction of the doping gas while forming the film.

EMBODIMENT 12

In this embodiment, the photoconductive layer 4 is formed in a back-to-back diode structure made from polycrystalline silicon (poly-Si). The photoconductive layer 4 has five-layer structure composed of films 41, 42, 43, 44 and 45. Concretely, the photoconductive layer 4 is composed of a p-type poly-Si film 41, an i-type poly-Si film 42, an n-type poly-Si film 43, an i-type poly-Si film 44, and a p-type poly-Si film 45.

As a method for forming the films, the p-type poly-Si film 41 is formed by a decompression heat CVD method using silane (SiH$_4$) gas and doping gas (B$_2$H$_6$). The temperature for forming the film is preferably in the range of 600° to 650° C. The most preferable temperature is about 620° C. The thickness of the film 41 is preferably in the range of 0.05 to 1.0 μm. The most preferable thickness is about 0.1 μm.

Then, the i-type poly-Si film 42 is formed by using silane (SiH$_4$) gas. The thickness of the film 42 is preferably in the range of 0.3 to 2.2 μm. The most preferable thickness is about 0.8 μm.

Then, the n-type poly-Si film 43 is formed by using silane (SiH$_4$) gas and doping gas (PH$_3$). The thickness of the film 43 is preferably in the range of 0.04 to 0.8 μm. The most preferable thickness is about 0.1 μm.

Next, the i-type poly-Si film 44 is formed by using silane (SiH₄) gas. The thickness is preferably in the range of 0.3 to 2.5 μm. The most preferable thickness is about 0.9 μm.

The p-type poly-Si film 45 is formed by using silane (SiH₄) gas and doping gas (B₂H₆). The thickness of the film 45 is preferably in the range of 0.05 to 1.0 μm. The most preferable thickness is about 0.1 μm. The other structure of the embodiment 12 is the same as that of the embodiment 1.

For implementing the doping to the poly-Si material, it is possible to use an ion plantation technique for doping after forming the film in place of the introduction of the doping gas while forming the film.

The different respect of the present embodiment 12 from the embodiment 11 is the addition of the i-type poly-Si film for the purpose of improving a photoconductive effect. The embodiment 10 may be adapted to have the i-type poly-Si film as well.

The foregoing embodiments have employed silicon as a material of the photoconductive layer. However, it goes without saying that the photoconductive layer 4 can be composed of germanium in place of silicon if a smaller optical band gap is required. In this case, germane and digermane may be used in place of silane and disilane.

As a method of forming the photoconductive layer, a sputtering method, a heat CVD method, an optical CVD method and an ECR plasma method may be utilized in addition to the plasma CVD method. As a gas, Si₂H₆ may be used in place of SiH₄ and so GeH₄ and GeH₆ are. Further, it is possible to use C₂H₆, C₃H₈, C₄H₁₀, C₂H₄, and C₂H₂ in addition to CH₄.

The foregoing embodiments have employed silicon and germanium as main materials for forming the films. However, the present invention may employ a III-V family compound semiconductor system material such as GaAs, AlGaAs, or InP in place of silicon and germanium.

As a liquid crystal display mode, it is possible to use a twisted nematic mode, an electric field inducing birefringence mode, a dynamic scattering mode, a guest host mode, and a phase transition effect mode in addition to the hybrid electric field effect mode employed in the foregoing embodiments, if the nematic liquid crystal is used. If the smectic liquid crystal is used, it is possible to use a birefringence mode, a guest host mode, and a light scattering mode. In addition, ferroelectric liquid crystal, polymeric liquid crystal, and a polymer dispersed liquid crystal film may be used as well.

Many widely different embodiments of the present invention may be constructed without departing from the spirit and scope of the present invention. It should be understood that the present invention is not limited to the specific embodiments described in the specification, except as defined in the appended claims.

What is claimed is:

1. A liquid crystal element of optical writing type comprising:
   a first transparent substrate having an electrode formed on a surface thereof;
   a second transparent substrate having an electrode formed on a surface thereof;
   a photoconductive layer configured as a back-to-back diode with an impedance that varies according to an amount of incident light and formed on the electrode of said first transparent substrate;
   a liquid crystal layer disposed between said photoconductive layer and said second transparent substrate; and
   a reflective layer disposed between said photoconductive layer and said liquid crystal for reflecting a light through said liquid crystal layer,
   said photoconductive layer including a junction with a wider optical band gap at one side thereof adjacent the electrode of said first transparent substrate than at another side thereof.

2. A liquid crystal element of optical writing type according to claim 1, wherein said photoconductive layer includes
   a first layer of P-type hydrogenated amorphous semiconductor,
   a second layer of an I-type hydrogenated amorphous semiconductor,
   a third layer of a N-type hydrogenated amorphous semiconductor,
   a fourth layer of an I-type hydrogenated amorphous semiconductor, and
   a fifth layer of a P-type hydrogenated amorphous semiconductor, said five layers being laminated.

3. A liquid crystal element of optical writing type according to claim 2, wherein said five layers are made of silicon, or germanium, as a main material.

4. A liquid crystal element of optical writing type according to claim 2, wherein said first layer is made of P-type hydrogenated amorphous silicon carbide and said second layer is made of I-type hydrogenated amorphous silicon carbide and said third layer is made of N-type hydrogenated amorphous silicon carbide, a hetero junction being formed between said second layer and said third layer.

5. A liquid crystal element of optical writing type according to claim 4, wherein said first layer is about 100–600 Å thick, said second layer is about 0.4–2.0 μm thick, said third layer is about 100–600 Å thick, said fourth layer is about 0.4–3 μm thick, and said fifth layer is about 100–600 Å thick.

6. A liquid crystal element of optical writing type according to claim 1, wherein said photoconductive layer includes
   a first layer of an N-type hydrogenated amorphous semiconductor,
   a second layer of an I-type hydrogenated amorphous semiconductor,
   a third layer of a P-type hydrogenated amorphous semiconductor,
   a fourth layer of an I-type hydrogenated amorphous semiconductor, and
   a fifth layer of an N-type hydrogenated amorphous semiconductor, said five layers being laminated.

7. A liquid crystal element of optical writing type according to claim 6, wherein said five layers are made of silicon, or germanium, as a main material.

8. A liquid crystal element of optical writing type according to claim 6, wherein said first layer is made of N-type hydrogenated amorphous silicon carbide, said second layer is made of I-type hydrogenated amorphous silicon carbide, and said third layer is made of P-type hydrogenated amorphous silicon carbide, a hetero junction being formed between said second layer and said third layer.

9. A liquid crystal element of optical writing type according to claim 8, wherein said first layer is about 100–600 Å thick, said second layer is about 0.4–2.0 μm thick, said third layer is about 100–600 Å thick, said fourth layer is about 0.4–3 μm thick, and said fifth layer is about 100–700 Å thick.

10. A liquid crystal element of optical writing type according to claim 6, wherein said first layer is made of N-type hydrogenated amorphous silicon carbide and said second layer is made of I-type hydrogenated amorphous silicon carbide, a hetero junction being formed between said second layer and said third layer.

11. A liquid crystal element of optical writing type according to claim 6, wherein said first layer is made of N-type hydrogenated amorphous silicon carbide and said second layer is made of I-type hydrogenated amorphous silicon carbide, a hetero junction being formed between said first layer and said second layer.

12. A liquid crystal element of optical writing type according to claim 6, wherein said first layer is made of N-type hydrogenated amorphous silicon nitride and said second layer is made of I-type hydrogenated amorphous silicon nitride, a hetero junction being formed between said first layer and said second layer.

13. A liquid crystal element of optical writing type according to claim 6, wherein said first layer is made of N-type hydrogenated amorphous silicon oxide and said second layer is made of I-type hydrogenated amorphous silicon oxide, a hetero junction being formed between said first layer and said second layer.

14. A liquid crystal element of optical writing type according to claim 1, wherein said photoconductive layer comprises silicon, or germanium, as a main material.

15. A liquid crystal element of optical writing type according to claim 1, wherein said junction comprises a hetero junction or homo junction.

16. A liquid crystal element of optical writing type according to claim 1, wherein said element further comprises:
   a pair of reflection-preventing films formed on said first and second transparent substrates, respectively;
   a light-blocking layer formed between said reflective layer and said first transparent substrate; and
   alignment layers formed on both sides of said liquid crystal layer.

17. A liquid crystal element of optical writing type according to claim 1, wherein said liquid crystal layer comprises a nematic liquid crystal, a smectic liquid crystal, a polymeric liquid crystal, or a polymer dispersed liquid crystal film.

* * * * *